United States Patent [19]

Suzuki et al.

[11] Patent Number: 4,812,387

[45] Date of Patent: Mar. 14, 1989

[54] METHOD OF FORMING FUNCTIONAL FILMS ON FINE TRANSPARENT ELECTRIC CONDUCTIVE CIRCUIT PATTERN AND SPACES THEREOF

[75] Inventors: Tameyuki Suzuki, Zushi; Junichi Yasukawa, Chigasaki; Toyokazu Nomura, Narashino; Kazuo Toda, Tokyo; Takuro Kamakura, Matsudo; Toshiaki Ota, Narashino, all of Japan

[73] Assignee: Shinto Paint Co., Ltd., Amagasaki, Japan

[21] Appl. No.: 38,125

[22] Filed: Apr. 14, 1987

[30] Foreign Application Priority Data

Apr. 21, 1986 [JP] Japan ................................ 61-91938

[51] Int. Cl.$^4$ ......................... G03C 5/00; G02F 1/13
[52] U.S. Cl. ................................. 430/311; 430/20; 430/321; 350/339 F
[58] Field of Search ............... 430/20, 321, 322, 323, 430/4; 350/336, 334, 339 R, 339 F

[56] References Cited

U.S. PATENT DOCUMENTS 4,617,094 10/1986 Kamamori et al. ............... 204/18.1

FOREIGN PATENT DOCUMENTS

| 34522 | 2/1982 | Japan | 430/20 |
| 60-114807 | 6/1985 | Japan | 430/4 |
| 61-43729 | 3/1986 | Japan | 430/20 |
| 2111285 | 6/1983 | United Kingdom | 430/20 |

Primary Examiner—José G. Dees
Attorney, Agent, or Firm—Armstrong, Nikaido, Marmelstein & Kubovcik

[57] ABSTRACT

The present invention is for a method of forming a coating film used for filling the space between the color stripes for a color filter which is used for colorization of a liquid crystal display. In particular, the light-shielding electrodeposition coating is first formed in a transparent electric conductive circuit pattern so as to suppress the reaction of a photo-setting material against light which is to be applied to the electrodeposition coating.

2 Claims, No Drawings

METHOD OF FORMING FUNCTIONAL FILMS ON FINE TRANSPARENT ELECTRIC CONDUCTIVE CIRCUIT PATTERN AND SPACES THEREOF

The present invention relates to a method of forming functional films on a fine transparent electric conductive pattern and the spaces thereof, respectively, on a transparent base board having the fine transparent electric conductive pattern. More particularly, the present invention relates to a method which is useful for forming a thin film which functions as a color filter used for colorization of a liquid crystal display on the fine transparent electric conductive circuit pattern and for forming a functional film to fill the spaces of the circuit pattern which constitutes color strips, thereby screening unnecessary light and improving other properties.

DESCRIPTION OF THE PRIOR ART

In a conventional color filter which is used for colorization of a liquid crystal display, the spaces between the stripes of the color filter are filled with a light-shielding film in order to screen unnecessary light and improve other properties. As a method useful for forming such a thin film and a thin film on a fine transparent electric conductive circuit pattern which constitutes the color filter, a printing technique such as a silk screening method and an offset method, and a photolithography method which requires a very complicated process have conventionally been known.

PROBLEMS TO BE SOLVED BY THE INVENTION

Among such conventional methods, a method adopting a printing technique is only adaptable to a film which does not require high accuracy, for example, to a film for a circuit pattern of at least about 100μ or the spaces thereof. On the other hand, a photolithography method can improve the accuracy than the method adopting a printing technique, but its complicated and expensive process greatly limits its possibility of being put to practical use. Accordingly, it is an object of the present invention to overcome the above-described defects in the prior art and to provide a method which enables high accuracy and which is economically advantageous.

MEASURES FOR OVERCOMING THE PROBLEMS

The present inventors hit upon an idea during the study of the prior art that a thin film having a light shielding property and functionality, for example, as a color filter is to be formed on transparent electric conductive circuit pattern on a transparent base board in advance so that the reaction of a thin film of a photo-curable material against light which is to be applied to the previously formed thin film may be suppressed, and that at the other portions, namely, on the spaces of the circuit pattern, the thin film may be formed by light curing reaction as a functional film, for example, a light-shielding and/or adhesive film. On the basis of this unique idea, the present invention has been achieved.

That is, according to the present invention, when a functional film is formed on a fine transparent electric conductive circuit pattern and on the spaces thereof on a transparent base board, a thin film (sometimes referred to as "precoat" hereinunder) having a functionality and a light-shielding property is formed in advance solely on the circuit pattern by a given method, and after it is cured, the transparent base board including the precoat is coated with a material which has photo-curability and is capable of forming a functional film by an appropriate given method. After this thin film (sometimes referred to as "second coat" hereinunder) is prebaked by an appropriate method under an appropriate condition, as occasion demands, the back surface of the transparent base board, namely, the surface provided with no electric conductive pattern is irradiated with light to cure the thin film of a photo-curable material. At this time, since the portions at which the precoat is formed have a light-shielding property and, hence, light is screened there, the photo-curable material is not cure at those portions. Therefore, the light curing operation progresses only on the spaces of the electric conductive pattern on which the precoat is not formed.

Thereafter, the uncured thin film (second coat) of a photo-curable material on the precoat is removed with an appropriate reagent, thereby leaving the functional film only on the spaces of the electric conductive circuit pattern. The remaining functional film is postbaked or further irradiated with light, if necessary. Thus, it is possible to form thin films having the respective functions on the electric conductive pattern and the spaces thereof with high accuracy.

The above-described structure of the present invention will be explained in detail in the following.

The first step is a step of forming a thin film (precoat) having the intended functionality and a light-shielding property on a transparent electric conductive circuit pattern on a transparent base board.

As a base board in the present invention, a glass or plastic plate is usable. A transparent electric conductive circuit pattern formed on the base board is made of an ITO film (tin-doped indium oxide) or a NESA film (antimony-doped tin oxide). As these films are well known to those who are skilled in the art, detailed description will be omitted here.

In order to form a thin film, namely, precoat having a light-shielding property on the above-described transparent electric conductive circuit pattern, a method adopting a printing technique such as an offset method and a silk screening method, a photolithography method and high polymer electrodeposition coating are usable. Among these, high polymer electrodeposition coating is advantageous in that it is possible to form a thin coat (precoat) on a transparent electric conductive circuit pattern with fidelity and good accuracy. High polymer electrodeposition is generally known as electrodeposition coating. As an electrodeposition coating method, there are anionic electrodeposition and cationic electrodeposition, both of which are usable.

The material usable for the precoat is a resin material such as a maleinized oil, acrylic, polyester, polybutadiene, or polyolefin resin material. These materials may be used singly or in the form of a mixture.

An appropriate amount of pigment or other light-shielding material is mixed with the resin material in order to provide it with a light-shielding property. The mixing ratio of such a light-shielding material is so selected that the light shielding ratio of the three-layered portion which consists of the transparent base board, the transparent electric conductive circuit pattern and the precoat is not less than 70 % with respect to the exposing light of the wavelength for curing with light a photo-curable thin film (second coat) which is to be applied in the later-described second step.

If the precoat formed in the first step in the present invention is a thin film which is useful specifically as a color filter, pigments of red, green, blue etc., which have a light penetrating property in a visible region and a light shielding property with respect to the light of wavelength used for curing the thin film applied in the second step, e.g., the UV light, are preferably used. As such a pigment, red oxide, azo red pigment, quinacridon red pigment, perylene red pigment, phthalocyanine green pigment, phthalocyanine blue pigment, etc., which have a high transparence, are usable. As a material which does not have a function as a color filter but merely provides a light-shielding property, carbon black, titanium oxide, etc. are usable.

The precoat must be a thin film having a strength which is not interfered with the coating of the photo-curable film in the second step and the removal (development) thereof in the subsequent step, namely the strength which prevents the precoat from being removed and peeled off. For this purpose, according to the present invention, the precoat is cured by an ordinary method such as baking.

The second step of the present invention is a step of forming a thin film (second coat) having photo-curability and a functionality such as a light-shielding property and/or adhesiveness on the transparent base board including the thin film which has been formed in the first step.

A second coat is applied in the second step by a known method which enables a thin film to be comparatively uniformly obtained such as spin coating, roll coating, offset printing and dip coating. As a functional material having photo-curability, what is called a UV-cured type material, which shows curing reaction in the UV region, is preferable in terms of facility. The main components of the UV-cured material are acrylic, urethane, epoxy, synthetic rubber and polyvinyl alcohol resins, rubber and gelatin. These materials may be used singly or in the form of a mixture. They are commercially available as a photo-curable type coating or a negative type resist. It is preferable to appropriately add a reactive diluent, photopolymerization initiator, photo-sensitizer, etc. to provide them with photo-curability. A necessary additive is added in accordance with the function to be obtained. For example, when the thin film is used for light shielding, an appropriate pigment or other light-shielding material is added, and when the function for adhesion is required, an appropriate material for enhancing the adhesive force is added. As the light-shielding material, for example, carbon black, ion oxide, titanium white, phthalocyanine pigment, threne pigment and aniline black are used.

In forming a second coat, an organic solvent dilution type material is diluted with an appropriate organic solvent such as hydrocarbon, ester and ketone and a water dilution type material is diluted with water, respectively, to an appropriate viscosity or solid content before use in order to improve the coating workability. The second coat formed in this way may be prebaked, if necessary, before the third step in order to disperse the diluent and to provide a certain degree of strength.

The third step of the present invention is a step of exposing the back surface of the transparent base board to light.

Light in various ranges is usable for light exposure in the third step in accordance with the kind of the second coat. Light in the UV range is generally preferable and an apparatus using an ultra-high-pressure mercury lamp, a metal halide lamp or the like is usable as the light source. The exposure condition is different depending upon the quantity of light to be used and the kind of the material of the second coat, but it is generally about 0.1 sec. to 60 sec. At the exposed portion, crosslinking reaction proceeds and the portion is insolubilized. At this time, the second coat are not cured by light at the portions formed on the precoat due to the light-shielding property of the precoat.

The fourth step of the present invention is a step of peeling off or remove the uncured portions of the second coat on the precoat.

The uncured portions of the second coat are preferably removed by bringing them into contact with a reagent having an appropriate solvent power such as what is called a developer. Various reagents (developers) may be selected in accordance with the kind of the second coat applied in the second step, and alkaline aqueous solutions such as caustic soda and sodium carbonate, and organic solvents such as ester, ketone, alcohol, aromatic hydrocarbon, aliphatic hydrocarbon and chlorinated hydrocarbon are generally appropriately used. When the uncured portions are removed, they are brought into contact with such a reagent by dipping, showering, etc. for about 10 seconds to 5 minutes. In this step, the uncured portions of the second coat on the precoat are removed, so that the functional film with which the spaces of the transparent electric conductive circuit pattern are filled and the functional film. e.g., for a color filter on the transparent electric conductive circuit pattern are finally left. The remaining films are thoroughly washed with water, an organic solvent, or the like, and they are then postbaked, if necessary.

OPERATION

According to the above-described method of the present invention, since it is possible to form a functional film, for example, a thin film which is useful as a color filter, on a fine transparent electric conductive circuit pattern and a film having an excellent light-shielding property on the spaces of the circuit pattern with high accuracy, it is possible to make the color display of, for example, a liquid crystal display clear.

DESCRIPTION OF THE EMBODIMENTS

The present invention will be explained in detail with reference to the following examples.

EXAMPLE 1

(1) Transparent circuit board having a fine transparent electric conductive circuit pattern:

On a glass substrate of 1.1 mm thick, ITO circuits (60$\Omega$/square) of 200$\mu$ wide were formed at an interval of 40$\mu$ on the parallel lines (240$\mu$ pitch).

(2) A thin film formed on the transparent electric conductive circuit pattern:

Blue, green and red coating agents in the following mixing ratio were used to form thin films on the transparent electric conductive circuit pattern formed in the step (1) by electrodeposition, and the thus-formed thin films were then baked at 175° C. for 30 minutes to form color filter films of blue, green, red, respectively, of 1.5$\mu$ thick.

| Coating agent for electrodeposition | | | |
|---|---|---|---|
| | Blue | Green | Red |
| | (part by weight) | | |
| Cationic acrylic resin (produced by Shinto Paint Co. Ltd) | 55 | 55 | 55 |
| Ethyl Cellosolve | 18 | 18 | 18 |
| Isopropyl alcohol | 3 | 3 | 3 |
| Acetic acid (neutralizer) | 1.2 | 1.2 | 1.2 |
| Ion exchange water | 917.8 | 917.8 | 917.8 |
| Phthalocyanine blue (SR-150, produced by Sanyo Shikiso K.K) | 5 | | |
| Phthalocyanine green (SAX, produced by Sanyo Shikiso K.K) | — | 5 | |
| Azo metal red pigment (Pigment red 4BS, produced by Sanyo Shikiso K.K.) | — | — | 5 |
| | 1000.0 | 1000.0 | 1000.0 |

After the formation of the respective color filter films, the light shielding ratio of the three-layered portion consisting of the glass substrate, the transparent electric conductive circuit pattern and the corresponding color filter film with respect to the light of the wavelength of 313 nm was 90 % in the red filter, 98 % in the green filter, and 99% in the blue filter. The light-shielding ratio with respect to the light of the wavelength of 365 nm was 75 % in the red filter, 95 % in the green filter and 87 % in the blue filter.

(3) Photo-setting light-shielding film:

100 parts by weight of cyclohexanone containing 10 parts by weight of solid content of an acrylic photo-setting resin [(FVR) produced by Fuji Yakuhin K.K] with 2 parts by weight of aniline black dye dissolved therein was applied by a spinner to the entire part of the base board produced on the step (2) at a speed of 1,000 rpm. After the application, the film was prebaked at 100° C. for 10 minutes. The thickness of the thus-formed film was 1.2$\mu$, and the light shielding ratio was 90 % in the visible region.

(4) Light exposure and curing of the photo-setting light-shielding film:

The back surface of each of the products obtained in the step (3) was irradiated with the UV light beam of 80 W/cm from a distance of 10 cm for 2 seconds. The dominant wavelengths at this time were 313 and 365 nm.

(5) Development and washing:

Each of the products obtained in the step (4) was immersed in an FVR developer (produced by Fuji Yakuhin K.K.) for 2 minutes to remove the un-exposed, namely, uncured photo-curable film on each of the color filters. The remaining film was immersed in an FVR cleaning agent (produced by Fuji Yakuhin K.K.) for 30 seconds to be washed, and then was heated at 150° C. for 30 minutes to be postcured.

The final product obtained in the above-described way had excellent characteristics as a three-color filter having a light-shielding film with which the spaces of the electric conductive circuit pattern were filled with high accuracy.

EXAMPLE 2

A color filter film was formed on the transparent glass substate having the fine transparent electric conductive circuit pattern formed in the step (1) in Example 1 by using the green coating agent used in the step (2) in Example 1 by a screen printing method. The thus-formed color filter film was baked at 175° C. for 30 minutes. The thickness of the film was 2.5$\mu$, and the light shielding ratio of the three-layered structure with respect to the light of the wavelength of 313 nm was 98%, and that with respect to the light of the wavelength of 365 nm was 93%.

15 parts by weight of solid content of xylol liquid of an acrylic resin (Aronix UV#3351, produced by Toa Gosei Kagaku K.K) which contains 2 wt % (with respect to the solid content) Irgacure #907 was applied to the entire part of the base board with the green color filter formed thereon as described above by a spinner at a speed of 800 rpm. After the application, the film was prebaked at 70° C. for 10 minutes. The thickness of the thus-formed film was 2.0$\mu$.

The back surface of the base board was then irradiated with the UV light beam of 80 W/cm from a distance of 10 cm for 10 seconds. The dominant wavelengths at this time were 313 and 365 nm.

The base board was next subjected to ultrasonic treatment in xylol for 10 minutes to remove the uncured photo-curable film on the color filter.

Thereafter the base board was heated at 100° C. for 30 minutes to be postcured.

The-thus obtained base board had a light-shielding thin film of 2.0$\mu$ thick formed between clear green stripes with high accuracy.

ADVANTAGES OF THE INVENTION

According to the present invention, it is possible to form a functional film having high accuracy not only on a transparent electric conductive circuit pattern but also on the spaces thereof on a transparent base board. Accordingly, it is possible to make the color stripes of a three-color filter for, e.g., a liquid crystal display clear and to make a color filter having excellent optical characteristics.

What we claim is:

1. A method of forming a first functional film on an electroconductive circuit pattern on a transparent base board, said base board having said pattern on one surface thereof, and a second functional film covering the spaces about the pattern which comprises:
    forming a thin light-shielding first functional film on the pattern and curing the film by high polymer electrode deposition coating, said film functioning as a color filter;
    applying a photo-curable, light-shielding, second functional film to the surface of the transparent base board having the first functional film thereon;
    exposing the surface of the transparent base board opposite to that having the functional films coated thereon to light and curing the portions of the photo-curable, second functional film covering the spaces about the pattern; and
    removing the uncured portions of the second functional film over the light-shielding, first functional film.

2. A method according to claim 1 wherein the cured, light-shielding first functional film on the pattern shields not less than 70% of the light to which it is exposed when the surface of the transparent base board opposite to that having the functional films coated thereon is exposed to light to cure the portions of the photocurable, second functional film covering the spaces about the pattern.

* * * * *